United States Patent
Maurya et al.

(10) Patent No.: US 9,525,554 B2
(45) Date of Patent: Dec. 20, 2016

(54) DEVICE AND METHOD FOR IDENTIFYING A CERTIFICATE FOR MULTIPLE IDENTITIES OF A USER

(75) Inventors: Sanjiv Maurya, Fremont, CA (US); Jack Cai, San Jose, CA (US)

(73) Assignee: Google Inc., Mountain View, CA (US)

( * ) Notice: Subject to any disclaimer, the term of this patent is extended or adjusted under 35 U.S.C. 154(b) by 2314 days.

(21) Appl. No.: 12/207,820

(22) Filed: Sep. 10, 2008

(65) Prior Publication Data

US 2009/0300344 A1    Dec. 3, 2009

Related U.S. Application Data

(60) Provisional application No. 61/057,572, filed on May 30, 2008.

(51) Int. Cl.
*H04L 29/06* (2006.01)
*H04L 9/32* (2006.01)

(52) U.S. Cl.
CPC ......... *H04L 9/3263* (2013.01); *H04L 63/0823* (2013.01); *H04L 2209/805* (2013.01)

(58) Field of Classification Search
CPC ............... H04L 63/0823; H04L 9/3263; H04L 2209/805; H04L 29/06

USPC .................................................. 713/153, 156
See application file for complete search history.

(56) References Cited

U.S. PATENT DOCUMENTS

| 7,216,227 B2* | 5/2007 | Grynberg ...................... 713/162 |
| 2004/0254918 A1* | 12/2004 | Pereira et al. ..................... 707/3 |
| 2006/0047962 A1* | 3/2006 | Adams ................ H04L 63/0823 713/175 |
| 2006/0294368 A1* | 12/2006 | Adams .................... H04L 51/38 713/156 |
| 2007/0029921 A1 | 2/2007 | Jin et al. |
| 2007/0083749 A1* | 4/2007 | Fang ....................... H04L 12/58 713/152 |
| 2008/0209208 A1* | 8/2008 | Parkinson ........... H04L 63/0428 713/156 |

* cited by examiner

*Primary Examiner* — Krista Zele
*Assistant Examiner* — James Forman
(74) *Attorney, Agent, or Firm* — Fenwick & West LLP

(57) ABSTRACT

A device and method associates a certificate with a first recipient identity. The method comprises receiving the first recipient identity of a user. The method comprises associating the first recipient identity of the user with a second recipient identity of the user. The second recipient identity is associated with a certificate so that subsequent transmissions of data to the first recipient identity encrypts the data according to specifications of the certificate.

15 Claims, 3 Drawing Sheets

DEVICE AND METHOD FOR IDENTIFYING A CERTIFICATE FOR MULTIPLE IDENTITIES OF A USER

PRIORITY CLAIM

This application claims the priority to the U.S. Provisional Application Ser. No. 61/057,572, entitled "Device and Method for Identifying a Certificate for Multiple Identities of a User," filed on May 30, 2008. The specification of the above-identified application is incorporated herewith by reference.

BACKGROUND INFORMATION

A certificate may be used to transmit data from a first computing device to a second computing device. The certificate may be part of a security arrangement where the data is encrypted by the first computing device and decrypted by the second computing device. One requirement of the certificate is that a key is used between the first and second computing terminals. The key may be a common algorithm used by the first and second computing devices where the encryption is a first direction of the algorithm and the decryption is a reverse direction of the algorithm. In this case, the key must be securely shared between the first and second computing devices to ensure the security arrangement is maintained. The key may also be a public key and a private key pair. The public key may be known by any transmitting device such as the first computing device to encrypt the data. The private key may be known only by a receiving computing device such as the second computing device to decrypt the data. In this case, the public key is not required to be securely shared since the public key is not configured to perform any function other than to encrypt the data while the private key is only known by the receiving computing device. Other security arrangements may be implemented so that only intended recipients are capable of decrypting the data. However, in any of the security arrangements, the certificate used by the recipient must be known so that the data may be properly encrypted.

SUMMARY OF THE INVENTION

Figure 1:
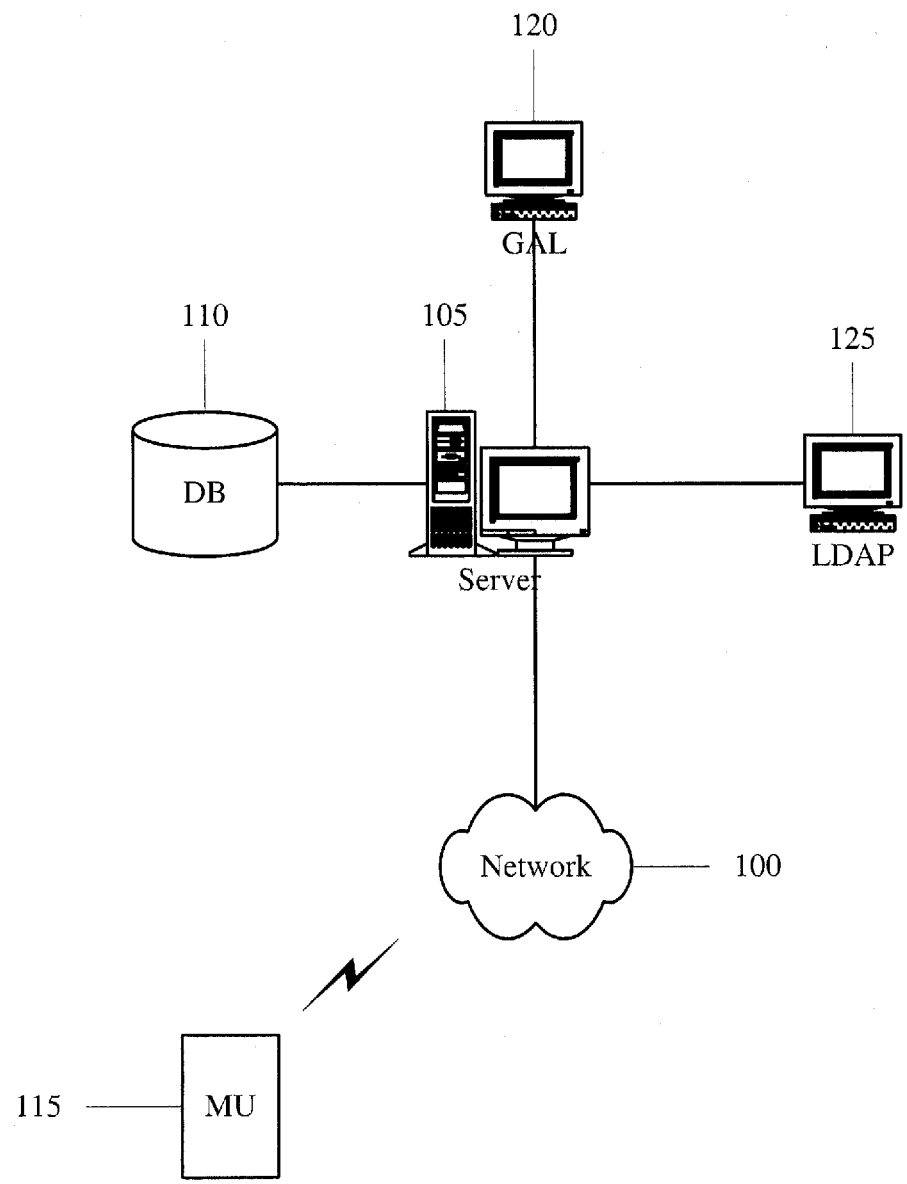
FIG. 1 shows a network for identifying a certificate according to an exemplary embodiment of the present invention.

The present invention relates to a device and method for associating a certificate with a first recipient identity. The method comprises receiving the first recipient identity of a user. The method comprises associating the first recipient identity of the user with a second recipient identity of the user. The second recipient identity is associated with a certificate so that subsequent transmissions of data to the first recipient identity encrypts the data according to specifications of the certificate.

DETAILED DESCRIPTION

The exemplary embodiments of the present invention may be further understood with reference to the following description and the appended drawings, wherein like elements are referred to with the same reference numerals. The exemplary embodiments of the present invention describe a device and method for identifying a certificate for multiple identities of a single recipient. Identifying the certificate enables a secure transmission of data from a sender to the recipient. According to the exemplary embodiments of the present invention, a client application of the sending device attempts to identify the certificate used by the recipient automatically. The exemplary embodiments of the present invention further identify the certificate when the identity of the recipient is not directly associated with the certificate. The identities, the associations, the certificate, the client application, and associated methods will be discussed in more detail below.

The exemplary embodiments of the present invention illustrate that a first computing device (i.e., transmitting device) is a mobile unit (MU). However, those skilled in the art will understand that the exemplary embodiments of the present invention may be applied to any computing device including mobile and stationary ones (e.g., desktop computer). In addition, the exemplary embodiments of the present invention relate to transmission of encrypted data. However, the exemplary embodiments of the present invention further include aspects related to the second computing device (i.e., receiving device). The aspects of the second computing device will be discussed in further detail below.

FIG. 1 shows a network 100 for identifying a certificate according to an exemplary embodiment of the present invention. The network 100 may be any communications arrangement in which at least two computing devices are capable of communicating with each other. For example, the network 100 may be a local area network (LAN), a wireless local area network (WLAN), a private area network (PAN), a wide area network (WAN), etc. The network 100 may include a server 105 and a database 110. Within an operating area of the network 100 may be a MU 115.

The server 105 may be configured to be responsible for the operations occurring within the network 100. The database 110 may store data relating to the network 100 such as association lists. According to a first exemplary embodiment of the present invention, the database 110 may also store data relating to recipient identities and respective associated certificates. The network 100 may further include other network components such as a switch to direct data appropriately, access points (AP) to extend the operating area of the network 100, a network management arrangement (NMA), etc. Those skilled in the art will understand that the components of FIG. 1 are only exemplary and that the functionality described herein of the components may reside in other devices. For example, the functionality described for the server 105 may reside in some other network node such as a switch or router. In addition, the functionality described as residing in a single device may reside in multiple devices. For example, the database 110 may be distributed to a plurality of network devices.

The MU 115 may be any mobile computing device such as a mobile computer, a personal digital assistant (PDA), a laptop, an RFID reader, a scanner, an image capturing device, a pager, etc. However, as discussed above, the MU 115 may also represent any computing device including stationary devices. The MU 115 may be disposed within an operating area of the network 100 and, thus, communicatively connected with the server 105. Accordingly, the MU 115 may include a transceiver and an antenna to exchange data with the network 100. According to the exemplary embodiments of the present invention, the MU 115 may be a transmitting device that has the capability of encrypting data prior to transmission. The encryption may be any known method.

According to the exemplary embodiments of the present invention, the MU 115 may transmit data to another computing device. Furthermore, the data may be encrypted so that only the intended recipient is capable of decrypting the data. The security arrangement for the secure transmission of data may be determined by a certificate. In order to properly encrypt the data so that the intended recipient computing device is configured to decrypt the data, the specifications of the certificate utilized by the recipient is also used by the MU 115.

The MU 115 may include a client application that performs the encryption according to the specifications of the certificate. According to the exemplary embodiments of the present invention, the client application may also be configured to determine the appropriate certificate and, thus, the appropriate encryption method.

The client application may identify the appropriate certificate from a variety of locations. As discussed above, according to the first exemplary embodiment of the present invention, the database 110 may store a recipient identity of a certificate. According to a second exemplary embodiment of the present invention, a memory of the MU 115 may store substantially similar data so that the identifying may be performed locally. According to a third exemplary embodiment of the present invention, a database of further servers such as a Global Address List (GAL) server 120 or a Lightweight Directory Access Protocol (LDAP) server 125 may store substantially similar data. The client application of the MU 115 may access any of these storage devices when identifying the appropriate certificate for the recipient identity.

The client application may access any of the above described databases to identify the certificate. The client application may be configured with an order for accessing the databases. For example, the client application may be configured to attempt to use a least amount of processing to identify the certificate. In such an exemplary embodiment, the client application may first attempt to identify the certificate locally by accessing the memory of the MU 115 and proceed with accessing the GAL server 120 and then the LDAP server 125. If the client application is aware that the identity of the receiving device is new and, thus, the identity of the certificate is not stored in the memory of the MU 115, the client application may bypass accessing the memory of the MU 115 and access the GAL server 120 and the LDAP server 125.

Once the certificate of the recipient is determined, the client application may encrypt the data to be transmitted. The encrypted data may be transmitted via the network 100 to a computing device associated with the recipient identity. For example, if the receiving computing device is connected to the network 100, the encrypted data may be transmitted via the network 100 to the switch that routes the encrypted data to the receiving computing device. In another example, if the receiving computing device is connected to a different network, the encrypted data may be transmitted via the network 100 to the further communications network that routes the encrypted data to the receiving computing device.

The receiving computing device may receive the encrypted data. Because the data is encrypted according to the certificate utilized by the receiving device, the data may be decrypted using an appropriate algorithm (e.g., cipher) of the certificate.

According to the exemplary embodiments of the present invention, the client application of the MU 115 may further be configured to identify the certificate of the recipient computing device when an identity of the recipient is not directly associated with the certificate. For example, the certificate may be associated with a first recipient identity of a user. However, the user may have requested that the data be transmitted to a second recipient identity of that user. As will be discussed below, because the client application is also configured to associate the certificate used by the user with at least one further recipient identity of the user, the client application may properly encrypt the data according to the certificate used by the recipient even when the recipient identity does not directly correspond to the recipient identity associated with the certificate.

According to the exemplary embodiments of the present invention, to associate at least one further recipient identity of the user with the certificate of the user under a different recipient identity, the client application may initially receive a one-time verification from the user. The verification may be, for example, a securely transmitted, signed correspondence (e.g., e-mail) indicating that the further recipient identity is associated with the recipient identity associated with the certificate. The client application may subsequently associate the further recipient identity with the certificate so that any further transmission of data to the further recipient identity will encrypt the data according to the specifications of the certificate associated with the different recipient identity. The association may be stored on, for example, any of the above described sources for identifying the certificate of a recipient computing device.

The client application may make the association in a variety of manners. In a first example, the client application may include a template that is completed by the user with multiple recipient identities. Upon receiving the completed template, the client application may associate a certificate associated with a first recipient identity to a second recipient identity that is not associated with the certificate. In a second example, the user with multiple recipient identities may indicate the association to the user of the MU 115. Thereafter, the user of the MU 115 may manually enter the association into the client application. In a third example, the user with multiple recipient identities may indicate to an organization associated with the GAL server 120 and/or the LDAP server 125 of the association between the at least two recipient identities. Thus, when the client application of the MU 115 attempts to identify the certificate of the recipient computing device, the association may be accessed whether the recipient identity is the primary identity of the user or a secondary identity of the same user.

Figure 2:
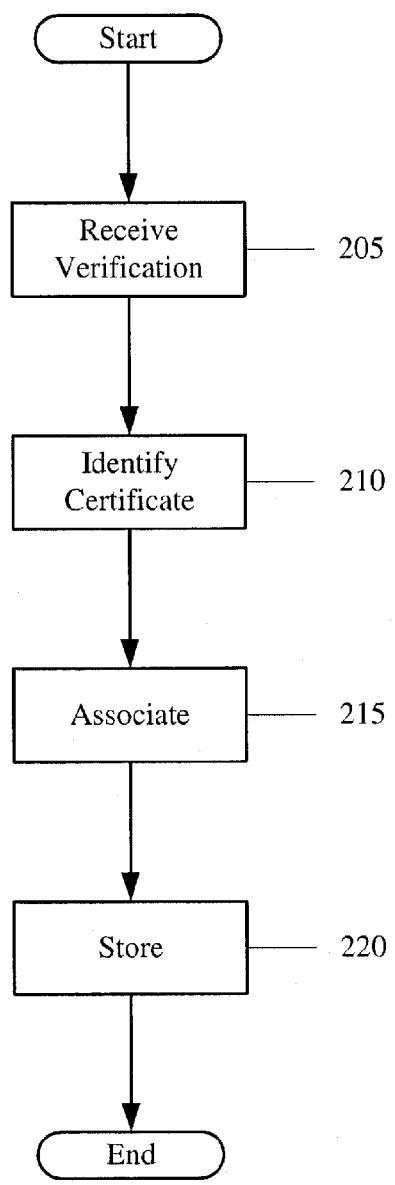
FIG. 2 shows a method for associating an identity of a recipient associated with a certificate under a different identity according to an exemplary embodiment of the present invention.

FIG. 2 shows a method 200 for associating an identity of a recipient associated with a certificate under a different identity according to an exemplary embodiment of the present invention. The method 200 will be described according to a client application of a computing device that is to transmit encrypted data. The method 200 will be described with reference to the network 100 of FIG. 1.

It should be noted that the method 200 may be performed by different applications depending on a location that stores the association. As discussed above, according to the first exemplary embodiment, the method 200 may be performed by an application of the server 105 when the association is stored in the database 110. According to the second exemplary embodiment, the method 200 may be performed by the client application of the MU 115 when the association is stored in the memory of the MU 115. According to the third exemplary embodiment, the method 200 may be performed by an application of the GAL server 120 and/or the LDAP server 125 when the association is stored in one of their respective databases.

In step 205, a verification is received. As discussed above, the verification is a one-time operation of the association process. The verification may indicate that a first recipient identity is for a same user as a second recipient identity that is already associated with a certificate. The verification may be, for example, a correspondence such as a signed e-mail.

In step 210, the identity of the certificate is determined. The verification may indicate the identity of the certificate. In this case, the method 200 may proceed to the following step. When the verification indicates the first recipient identity and the second recipient identity, the client application may use the second recipient identity to determine the certificate associated therewith. For example, the client application may perform a local search (e.g., memory of the MU 115) and/or a remote search (e.g., GAL server 120, LDAP server 125, etc.) to identify the certificate.

In step 215, an association is created between the first recipient identity and the identified certificate. As discussed above, the certificate is already associated with the second recipient identity. The verification indicates that the certificate of the second recipient identity is to be associated with the first recipient identity. The application such as the client application of the MU 115 may create the association.

In step 220, because the association that is created is a one-time process, the association may be saved. As discussed above, depending on which application created the association, the association may be stored in a variety of locations such as the memory of the MU 115, the database 110, and/or a respective database of the GAL server 120 and the LDAP server 125.

Consequently, by searching any of the above described databases, a certificate may be identified using either the first or second recipient identities. In addition, when further associations are created (e.g., third recipient identity, fourth recipient identity, etc.), the certificate may be identified based on any of the previously saved associations (e.g., the certificate for the third recipient identity may be identified by associating with either the first or second recipient identity).

Figure 3:
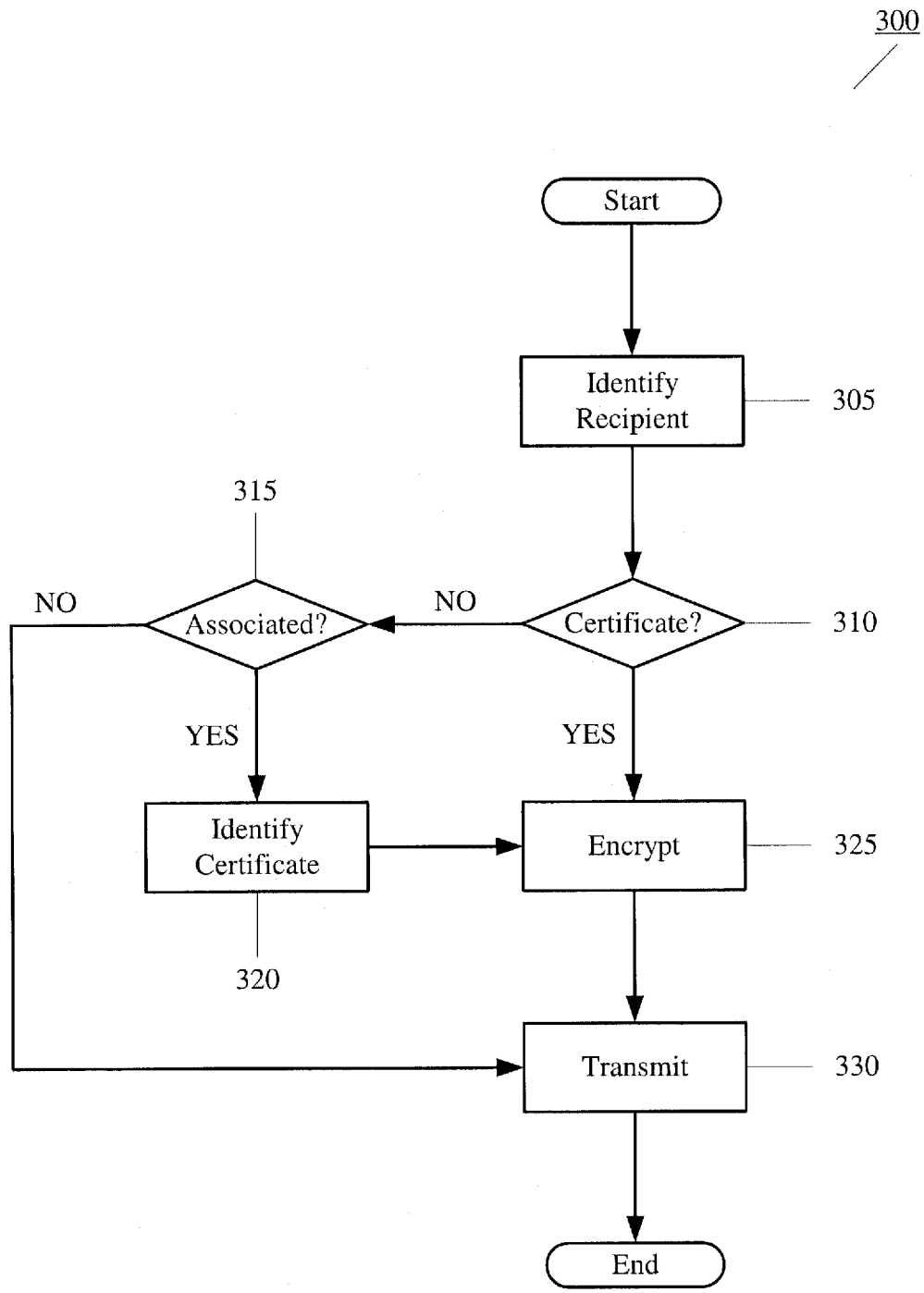
FIG. 3 shows a method for transmitting data according to a certificate of a recipient according to an exemplary embodiment of the present invention.

FIG. 3 shows a method 300 for transmitting data according to a certificate of a recipient according to an exemplary embodiment of the present invention. The method 300 will be described according to a client application of a computing device that is to transmit encrypted data. The method 300 will be described with reference to the network 100 of FIG. 1.

In step 305, a recipient identity is determined. In a first example, the recipient identity may be manually entered by the user of the MU 115. In a second example, the client application may receive the recipient identity. In step 310, a determination is made whether the recipient identity has a certificate associated therewith. If step 310 determines that the recipient identity is directly associated with the certificate, the method 300 continues to step 325 where the data to be transmitted is encrypted and subsequently transmitted in step 330.

If step 310 determines that the recipient identity is not directly associated with any certificate, the method 300 continues to step 315. In step 315, a determination is made whether the recipient identity has an association with another recipient identity. As discussed above with reference to the method 200, the recipient identity may have gone through a one-time process that associates the recipient identity with a different recipient identity and, thus, a certificate associated the method 300 may include a step that alerts the user of the MU 115. For example, a prompt may be shown on a display of the MU 115 that the data will be transmitted unencrypted. The user may then be prompted whether to continue or prevent the transmission. In another example, between steps 320 and 325, the method 300 may prompt the user of the association. Then, a verification step may be performed where the user of the MU 115 indicates whether to continue when the other recipient identity associated with the recipient identity is indicated to be associated. If the association of the identities is not recognized, the user may have an option to prevent the transmission.

The exemplary embodiments of the present invention enable a user of a MU to identify a certificate prior to transmission of data. By identifying the certificate, an appropriate encryption may be used with the data so that an intended recipient may properly decrypt the data. When a recipient identity does not have a certificate associated therewith, a certificate may still be identified when the recipient identity has been associated with another recipient identity of a common user that has been associated with a certificate. Through a one-time process, the recipient identity may be permanently associated so that any transmission of data to the recipient identity may always refer to the other recipient identity in which the certificate is associated. It should be noted that the recipient identity may be updated so that a different association to a further recipient identity is established.

Those skilled in the art will understand that the above described exemplary embodiments may be implemented in any with the different recipient identity. If step 315 determines that the recipient identity is not directly associated with a certificate (step 310) or not associated with another recipient identity (step 315), the method 300 continues to step 330 where unencrypted data is transmitted.

It should be noted that when the recipient identity is not directly associated with a certificate or not associated with another recipient identity, the client application may determine whether the data to be transmitted includes confidential material. Rather than merely transmitting the data unencrypted, the client application may prevent the transmission when the data includes confidential material. It should also be noted that if the client application is aware than an encryption is to be used but cannot identify the encryption (e.g., no direct association to a certificate or further recipient identity is included in any of the databases), the transmission may be prevented.

If step 315 determines that the recipient identity is associated with another recipient identity, the method 300 continues to step 320 where the certificate associated with the other recipient identity is determined. The client application may determine the certificate of the other recipient identity. Once determined, the specifications of the certificate may be accessed. Subsequently, the data to be transmitted may be encrypted accordingly (step 325) and transmitted (step 330).

It should be noted that the method 300 may include additional steps. For example, if step 315 determines that the recipient identity is not associated with a certificate or another recipient identity, prior to transmitting (step 330), number of manners, including, as a separate software module, as a combination of hardware and software, etc. For example, the client application may be a program containing lines of code that, when compiled, may be executed on a processor of the MU 115. It should also be noted that the client application may be part of another application such as an email application.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method for associating a certificate with a first recipient identity of a user, comprising:
   receiving, at a computing device, the first recipient identity of the user;
   receiving, at the computing device, a verification from the user for directly associating the first recipient identity of the user with a second recipient identity of the user, wherein the verification is an authenticated correspondence from the user indicating that the first recipient identity and the second recipient identity relate to a same user; and
   associating, at the computing device based on the verification, the first recipient identity of the user with the second recipient identity of the user, the second recipient identity being associated with a certificate so that subsequent transmissions of data to the first recipient identity encrypts the data according to specifications of the certificate.

2. The method of claim 1, further comprising:
   determining, by the computing device, the certificate of the second recipient identity by performing at least one of a local search and a remote search.

3. The method of claim 2, wherein the local search includes accessing a memory of the computing device performing the subsequent transmissions of data.

4. The method of claim 2, wherein the remote search includes accessing, by the computing device, at least one of a global access list (GAL) and a lightweight directory access protocol (LDAP).

5. The method of claim 1, wherein the receiving, at the computing device, the verification from the user comprises:
   receiving a manual entry associating the first recipient identity and the second recipient identity.

6. A method for identifying a certificate for multiple identities of a user, comprising:
   receiving, at a computing device, a first recipient identity of the user;
   determining, by the computing device, if the first recipient identity is directly associated with the certificate; and
   if the first recipient identity is not directly associated with a certificate,
       receiving, at the computing device, a verification from the user for directly associating the first recipient identity of the user with a second recipient identity of the user, wherein the verification is an authenticated correspondence from the user indicating that the first recipient identity and the second recipient identity relate to a same user, and
       determining, at the computing device based on the verification, an association of the first recipient identity with the second recipient identity of the user, the second recipient identity being associated with the certificate, the certificate including specifications for encrypting data to be transmitted to the first recipient identity.

7. The method of claim 6, wherein the determining, at the computing device, the association of the first recipient identity with the second recipient identity of the user comprises:
   performing one of a local search and a remote search.

8. The method of claim 7, wherein the local search includes accessing a memory of the computing device.

9. The method of claim 7, wherein the remote search includes accessing at least one of a global access list (GAL) and a lightweight directory access protocol (LDAP).

10. The method of claim 6, further comprising:
    encrypting the data to be transmitted to the first recipient identity according to the specifications of the certificate when the first recipient identity is directly associated with the certificate.

11. A device, comprising:
    a memory including association data between a first recipient identity and a second recipient identity, the first recipient identity not being directly associated with a certificate and the second recipient identity being associated with the certificate, wherein the first recipient identity and the second recipient identity are different,
    wherein the association data is generated upon receiving a verification from the user for directly associating the first recipient identity of the user with the second recipient identity of the user, wherein the verification is an authenticated correspondence from the user indicating that the first recipient identity and the second recipient identity relate to a same user; and
    a processor executing a client application, the client application utilizing the association data so that data to be transmitted to the first recipient identity is encrypted according to specifications of the certificate.

12. The device of claim 11, wherein the client application determines the certificate of the second recipient identity by requesting one of a remote search and a local search.

13. The device of claim 12, wherein the remote search includes accessing at least one of a global access list (GAL) and a lightweight directory access protocol (LDAP).

14. The device of claim 11, wherein the association data is manually entered.

15. A non-transitory computer readable storage medium including a set of instructions executable by a processor, the set of instructions comprising instructions for associating a certificate with a first recipient identity and operable to:
    receive the first recipient identity of a user;
    receive a verification from the user for directly associating the first recipient identity of the user with a second recipient identity of the user, wherein the verification is an authenticated correspondence from the user indicating that the first recipient identity and the second recipient identity relate to a same user; and
    associate, based on the verification, the first recipient identity of the user with the second recipient identity of the user, the second recipient identity being associated with the certificate so that subsequent transmissions of data to the first recipient identity encrypts the data according to specifications of the certificate, wherein the first recipient identity and the second recipient identity are different.

* * * * *